(12) United States Patent
Delivett et al.

(10) Patent No.: US 9,471,549 B2
(45) Date of Patent: *Oct. 18, 2016

(54) SYSTEMS AND METHODS FOR USER MODIFIABLE TRUNCATION

(71) Applicant: AppSense Limited, Warrington (GB)

(72) Inventors: Paul Delivett, Runcorn (GB); Richard James Somerfield, San Jose, CA (US); James Tupper, Warrington (GB)

(73) Assignee: APPSENSE LIMITED (GB)

( * ) Notice: Subject to any disclaimer, the term of this patent is extended or adjusted under 35 U.S.C. 154(b) by 427 days.

This patent is subject to a terminal disclaimer.

(21) Appl. No.: 13/683,557

(22) Filed: Nov. 21, 2012

(65) Prior Publication Data

US 2014/0143662 A1    May 22, 2014

(51) Int. Cl.
*G06F 17/24* (2006.01)
*G06F 17/21* (2006.01)

(52) U.S. Cl.
CPC .................................. *G06F 17/211* (2013.01)

(58) Field of Classification Search
None
See application file for complete search history.

(56) References Cited

U.S. PATENT DOCUMENTS

| | | | |
|---|---|---|---|
| 7,165,264 B1 | 1/2007 | Westrick | |
| 2006/0031893 A1* | 2/2006 | Fang et al. | 725/100 |
| 2007/0079334 A1* | 4/2007 | Silver | H04N 5/782 |
| | | | 725/58 |
| 2008/0303823 A1 | 12/2008 | Yanagawa | |
| 2009/0287470 A1* | 11/2009 | Farnsworth et al. | 704/3 |
| 2010/0122161 A1 | 5/2010 | Jardine-Skinner et al. | |
| 2011/0078560 A1 | 3/2011 | Weeldreyer et al. | |
| 2012/0327003 A1 | 12/2012 | Matsumura | |
| 2013/0307876 A1 | 11/2013 | Jones et al. | |

* cited by examiner

*Primary Examiner* — Kee M Tung
*Assistant Examiner* — Yi Wang
(74) *Attorney, Agent, or Firm* — Wilmer Cutler Pickering Hale and Dorr LLP

(57) ABSTRACT

Systems and methods are provided for displaying and manipulating the display of digital character strings where the length of the character string extends beyond the width of a desired output display. In response to a user request to display a character string, a client can generate a truncated representation of the character string using at least one truncation symbol when the character string extends beyond the width of an output display. A client can modify the display of the truncated representation of the character string in response to detecting a signal corresponding to a change in location of the truncation symbol. The signal can be detected from a touchscreen or input device. This allows a user to view any portion of a selected character string, including those portions that may be obscured by the truncation symbol.

20 Claims, 8 Drawing Sheets

Actual Name: This_is_a_really_long_filename_that_will_not_fit_into_a_normal_view.txt

Displayed Name:   This_is_a_really_long ... fit_into_a_normal_view.txt

Figure 3A Actual Name: This_is_a_really_long_filename_that_will_not_fit_into_a_normal_view.txt
Figure 3B Displayed Name: This_is_a_really_long ... fit_into_a_normal_view.txt
Figure 3C Displayed Name: This_is_a_reall ... _not_fit_into_a_normal_view.txt
Figure 3D Displayed Name: This_is_a_really_long_filename ... normal_view.txt
Figure 3

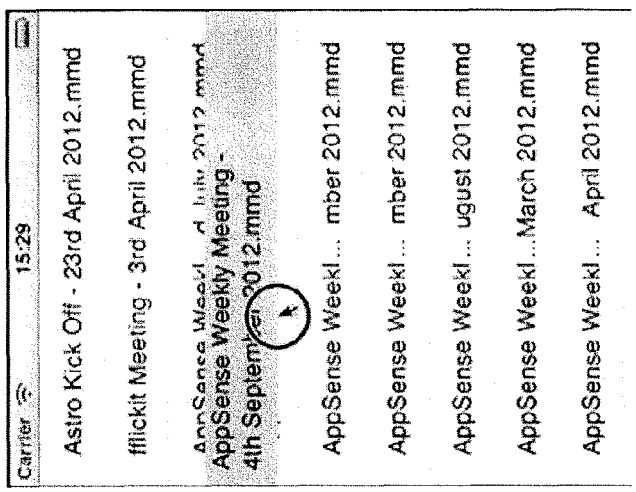
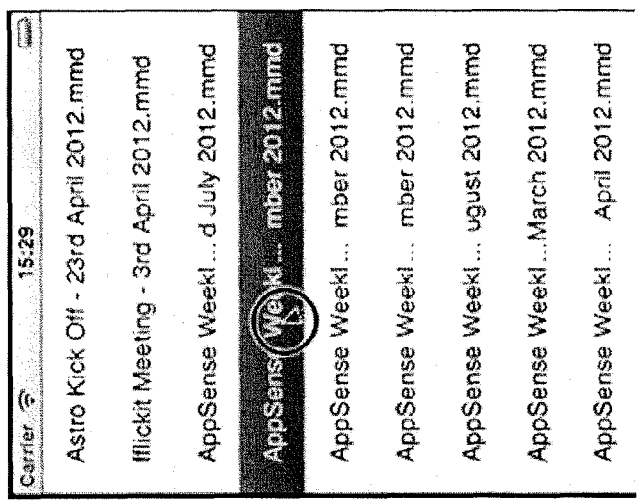
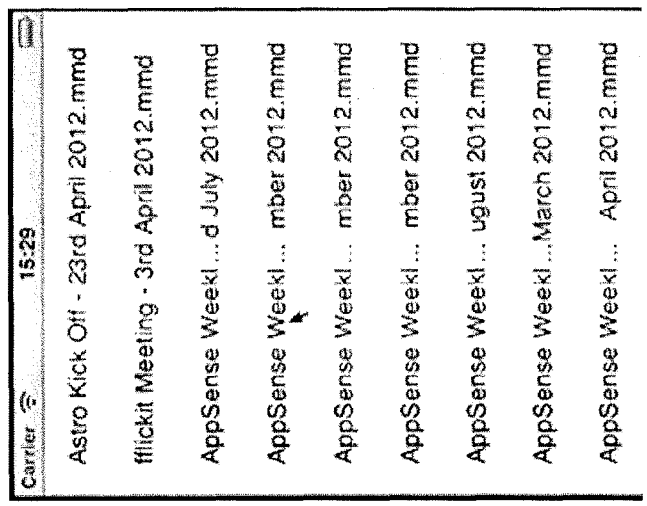
Figure 6A
Figure 6B
Figure 6C
Figure 6

SYSTEMS AND METHODS FOR USER MODIFIABLE TRUNCATION

CROSS-REFERENCE TO RELATED APPLICATION

This application is related to co-pending U.S. patent application Ser. No. 13/683,535, entitled "Systems and Methods for User Viewable Truncation," filed on even date herewith. This application is also related to co-pending U.S. patent application Ser. No. 13/683,825, entitled "Systems and Methods for Providing Contextual Based Truncation," filed on even date herewith. All aforementioned applications are expressly hereby incorporated by reference herein in their entirety.

BACKGROUND

1. Technical Field

Disclosed systems and methods relate to the display and manipulation of the display of digital character strings where the length of the character string extends beyond the width of a desired output display.

2. Description of the Related Art

The proliferation of mobile computing has radically altered the computing landscape. Crucial to the rise of mobile computing are the ever-expanding capabilities of these smaller, more mobile devices. As users interact more with the devices, they have come to expect that these devices perform more complex tasks and activities. Tasks and activities previously reserved for desktop, and even laptop computers, are now being performed using cellular telephones (e.g., smartphones) and tablet computing devices.

For example, the ability to perform tasks and activities such as browsing stored files, receiving and transferring stored files, as well as renaming stored files—tasks normally reserved for operating systems on desktops and laptops—are now being demanded by mobile users. The rising complexity of stored data accessed by mobile devices, however, parallels the increasing complexity of the applications and tasks performed by these devices. Accordingly, file names for attachments, media files, and document files have come to be very descriptive, and thus frequently very long.

Viewing long file names on mobile devices, however, is a challenge. The viewable display on a mobile device is always ultimately constrained by the physical dimensions of the entire device. Thus, the biggest advantage and benefit of a mobile computing device—its size—very quickly becomes a severe disadvantage and hindrance when viewing highly descriptive file names.

Mainstream smartphones today use four- or five-inch diagonal screens at most. Indeed, quite a few brands use smaller screens as well. While the screen sizes are generous in comparison to the screens of mobile phones in the past, these screens are only a fraction of the size of desktop and laptop monitors. Accordingly, reviewing long file names is often a troublesome and cumbersome affair.

In order to compensate, mobile devices employ a variety of techniques to show at least a portion of a long file name. For example, some devices may cut-off long file names at the right-hand edge of the screen. In other words, these devices display only the first portion of the file name onscreen, while leaving the remainder of the file name off-screen. Alternatively, some devices employ different methods of truncation to narrow the long file name to the width of the screen. The most popular forms of truncation generally omit characters at either the front, middle or end of a file name using ellipses.

Mobile devices and smartphones also often lack the ability to manipulate the file name as displayed. This further hinders the viewing of long file names on smaller screens since cut-off file names and conventional methods of truncation often obscure distinguishing information.

Therefore, there is a need to provide more convenient systems and methods for displaying and manipulating the display of long digital character strings where the length of the character string extends beyond the width of a desired output display. Accordingly, it is desirable to provide systems and methods that overcome these and other deficiencies of the related art.

SUMMARY

In accordance with the disclosed subject matter, systems and methods are provided for displaying and manipulating the display of digital character strings where the length of the character string extends beyond the width of a desired output display.

The disclosed subject matter includes a method. The method can include retrieving at least one character string; determining whether truncation is needed in order to display the character string on an output display; generating a first truncated representation of the character string when the character string extends beyond a width of the output display; displaying the first truncated representation on the output display, wherein the first truncated representation includes at least one truncation symbol to omit a portion of the character string; receiving a signal corresponding to a change in location of the truncation symbol from the first truncated representation; and in response to the signal, displaying a second truncated representation of the character string on the output display, wherein the second truncated representation includes the truncation symbol used to omit a different portion of the character string.

The disclosed subject matter also includes an apparatus comprising a processor configured to run a module stored in memory. The module can be configured to retrieve at least one character string; determine whether truncation is needed in order to display the character string on an output display; generate a first truncated representation of the character string when the character string extends beyond a width of the output display; display the first truncated representation on the output display, wherein the first truncated representation includes at least one truncation symbol to omit a portion of the character string; receive a signal corresponding to a change in location of the truncation symbol from the first truncated representation; and in response to the signal, display a second truncated representation of the character string on the output display, wherein the second truncated representation includes the truncation symbol used to omit a different portion of the character string.

The disclosed subject matter further includes a non-transitory computer readable medium having executable instructions. The executable instructions are operable to cause an apparatus to retrieve at least one character string; determine whether truncation is needed in order to display the character string on an output display; generate a first truncated representation of the character string when the character string extends beyond a width of the output display; display the first truncated representation on the output display, wherein the first truncated representation includes at least one truncation symbol to omit a portion of the character string; receive a signal corresponding to a change in location of the truncation symbol from the first truncated representation; and in response to the signal, display a second truncated representation of the character string on the output display, wherein the second truncated representation includes the truncation symbol used to omit a different portion of the character string.

In one aspect, the method, the apparatus, or the non-transitory computer readable medium can include steps, modules, or executable instructions for receiving the signal in response to detecting at least one of an input on a touchscreen corresponding to the output display and a location of a cursor from an input device. In one aspect, the input on the touchscreen can be from at least one of a stylus and a finger. In one aspect, the input device can be at least one of a mouse, trackball, touchpad, track pad, control stick, and keyboard.

In one aspect, the method, the apparatus, or the non-transitory computer readable medium can include steps, modules, or executable instructions for receiving a second signal corresponding to a location on the first or second truncated representation of the character string; and in response to the second signal, displaying at least one of the character string in its entirety or an excerpt of the first or second truncated representation of the character string.

In one aspect, the method, the apparatus, or the non-transitory computer readable medium can include steps, modules, or executable instructions for generating the first truncated representation of the character string. In one aspect, this can include analyzing the character string with a second character string for differences and similarities using a computing processor; and generating the first truncated representation of the character string based on predetermined parameters for truncation, wherein the first truncated representation includes similar and different portions of the character string and the second character string that maintain descriptive information that differentiates the character string from the second character string. In another aspect, this can include performing head, middle, or tail truncation.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A-3D illustrate the display and manipulation of the display of file names in accordance with an embodiment of the disclosed subject matter.

FIGS. 5A-5C illustrate the display and manipulation of the display of file names in accordance with an embodiment of the disclosed subject matter.

FIGS. 6A-6C illustrate the display and manipulation of the display of file names in accordance with an embodiment of the disclosed subject matter.

DETAILED DESCRIPTION

Figure 1:
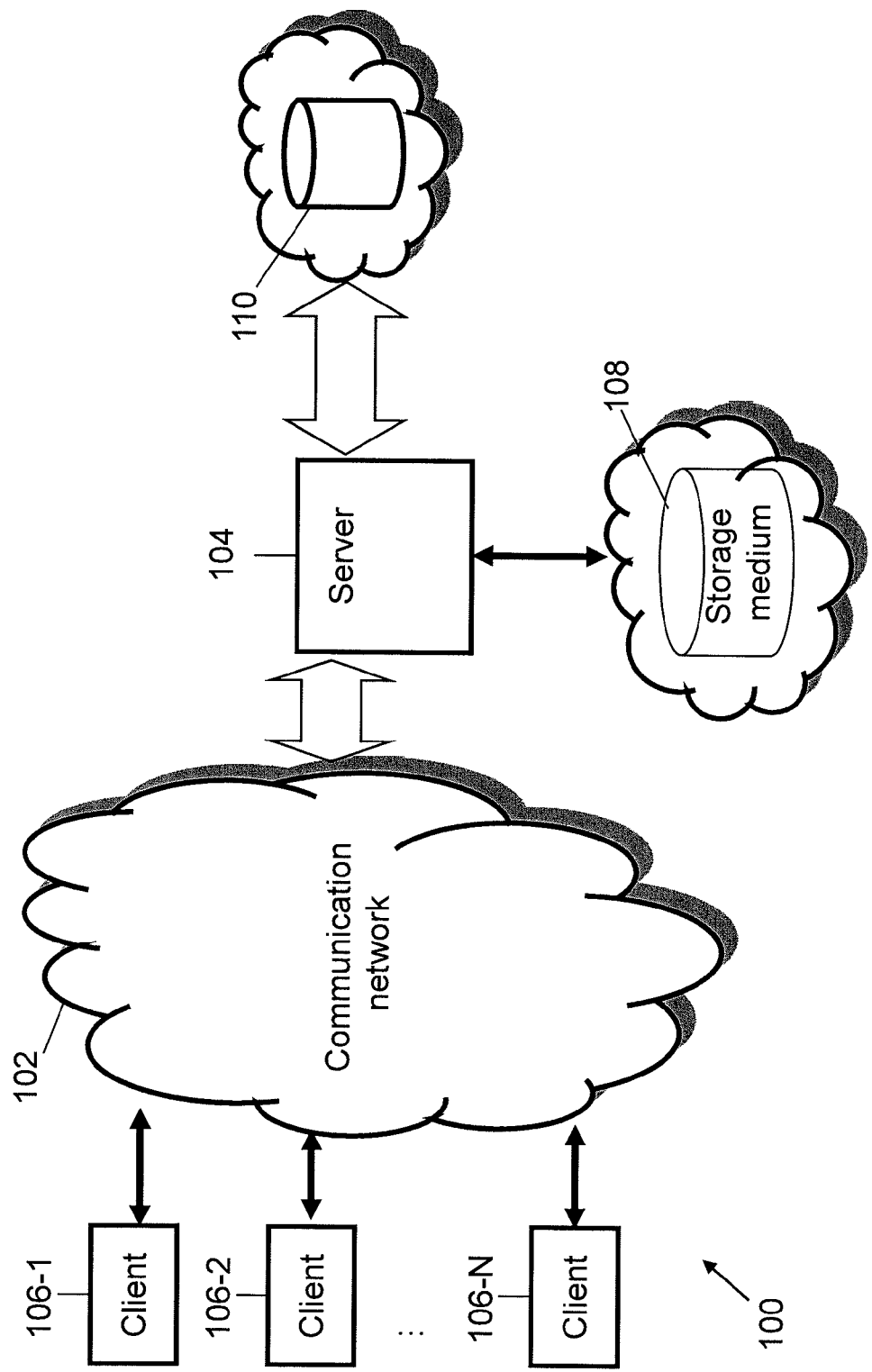
FIG. 1 illustrates a diagram of a networked system in accordance with an embodiment of the disclosed subject matter.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The disclosed subject matter relates to systems and methods for generating, displaying and manipulating the display of long character strings. In particular, the disclosed subject matter is aimed at correcting a problem in the prior art where long character strings are either not truncated or inappropriately truncated to fit into a smaller output display. This results in obscuring from the user distinguishing descriptive information about the character strings.

The invention is directed to long character strings, where the length of the character string extends beyond the width of a desired output display. The invention is primarily described below in the context of character strings in the form of digital file names corresponding to files stored in a storage medium. However, the invention applies to any other suitable types of character strings that are associated with digital communications and devices. For example, the character strings can be related to information in any suitable application including, for example, electronic mail application such as Microsoft Outlook (e.g., addresses, subject lines, attachments, body); Microsoft Office including Word, Excel, and PowerPoint (e.g., application menus, body); Adobe Acrobat (e.g., application menus, body), document management application such as Worksite or Imanage (e.g., application menus, list of file names); Internet browsers such as Internet Explorer, Firefox, Google Chrome or Safari (e.g., URL address, application menus, browser window). The character strings can also generally relate to digital menus, digital media tags, folder contents, or any other suitable information.

The invention is directed to the use of one or more truncation symbols to indicate the omission of characters in the display of the character string. The invention is primarily described below using ellipses (i.e., a series of three dots: " . . . ") to indicate where the character string has been truncated. However, the invention is directed to the use of any other suitable truncation symbol that is associated with digital communications and devices. The truncation symbol can include, for example, an asterisk (*), an en-dash ("—"), an em-dash ("—"), a hyphen ("-"), a plus ("+"), a period ("."), any other suitable character, any suitable number of characters, and any suitable combination of characters.

To accommodate long file names, the operating systems for mobile devices often truncate file names by omitting or hiding at least a portion of a given file name. Typical systems apply head truncation, mid truncation, and/or tail truncation to file names. The differences between each of these forms of truncation are best explained using an example group of file names. For example, consider the following group of three file names:
  AppSense Weekly Meeting—4th September 2012.txt
  AppSense Weekly Meeting—5th September 2012.txt
  AppSense Weekly Meeting—6th September 2012.txt
Where screen size would dictate some level of truncation, head truncation would use an ellipsis at the front of the file name in order to omit the leading characters of the file name. Head truncation thus only preserves the information at the end of a file name:
  . . . —4th September 2012.txt
  . . . —5th September 2012.txt
  . . . —6th September 2012.txt
This methodology, however, is not content specific, nor tailored for this particular set of file names. Frequently, the truncated characters are selected purely based on the number of displayable characters, i.e. the truncation point is earlier in the file name when the screen size is small, while the truncation point is later in the file name when the screen size is large. In this example, head truncation obscures the subject matter "AppSense Weekly Meeting," leaving the reader with no information about the file name other than the date information.

Mid-truncation uses an ellipsis in or around the center of the file name to truncate the middle characters of the file name. The middle characters of a given file name are obscured, while the starting and trailing characters of a file name are displayed. Mid-truncation thus only preserves the information at the beginning and end of a file name:
  AppSense . . . mber 2012.txt
  AppSense . . . mber 2012.txt
  AppSense . . . mber 2012.txt
Like head truncation, mid-truncation is not content specific, nor is it tailored for this particular set of file names. For this reason, mid-truncation also often obscures important distinguishing information for the sake of brevity.

Tail truncation uses an ellipsis at the end of a file name in order to truncate the trailing characters of the file name. The trailing characters of the file name are obscured, while a selection of the preceding characters of the file name are displayed. Tail truncation thus only preserves information at the beginning of a file name:
  AppSense Weekly Me . . . . txt
  AppSense Weekly Me . . . . txt
  AppSense Weekly Me . . . . txt
As with other standardized forms of truncation, the truncation point is often determined by the number of displayable characters and, therefore, is not content specific. This form of truncation thus may obscure important distinguishing information, such as date information.

The systems and methods in the present disclosure address the obscurity arising from standard truncation in several ways. In some embodiments, the disclosed systems and methods provide for an interactive means to adjust the location of the truncation. As discussed earlier, traditional forms of truncation are not content specific, often resulting in important distinguishing information being obscured. The systems and methods in the present disclosure allow a user to manually edit the truncation point (e.g., ellipsis) in order to display important distinguishing information.

In other embodiments, the disclosed systems and methods provide for an interactive way to view any text obscured by ellipses arising from truncation. For example, a user can select a truncated file name or a portion of a truncated file name to either display the entire file name or an excerpt of the file name. In some embodiments, the file name in its entirety can be displayed in a text box using wraparound text formatting. In some embodiments, the excerpt of the file name may be displayed in a larger font within a display object, such as a magnifying glass, loupe box, or any other suitable object.

In yet other embodiments, the disclosed systems and methods provide for an algorithm for contextually-focused truncation based on the similarities and/or differences among file names. For example, truncated representations can be generated based on predetermined parameters for truncation. In some embodiments, the truncated representations can include a mixture of some of the similarities and differences among the file names. In some embodiments, the predetermined parameters can include subject matter, date, time, or any other suitable parameter or combination of parameters.

FIG. 1 illustrates a diagram of a networked electronic system in accordance with an embodiment of the disclosed subject matter. The networked system 100 can include a communication network 102, a server 104, at least one client 106 (e.g., client 106-1, 106-2, . . . 106-N), a local network storage 108, and a remote network storage 110.

Each client 106 can send data to, and receive data from, the server 104 over the communication network 102. Each client 106 can be directly coupled to the server 104; alternatively, each client 106 can be connected to server 104 via any other suitable device, communication network, or combination thereof. For example, each client 106 can be coupled to the server 104 via one or more routers, switches, access points, and/or communication networks (as described below in connection with communication network 102). A client 106 can include a desktop computer, a mobile computer, a tablet computer, a cellular device, or any computing system that is capable of performing computation. The server 104 can be a single server, or a network of servers, or a farm of servers in a data center.

The communication network 102 can include the Internet, a cellular network, a telephone network, a computer network, a packet switching network, a line switching network, a local area network (LAN), a wide area network (WAN), a global area network, or any number of private networks that can be referred to as an Intranet. Such networks may be implemented with any number of hardware and software components, transmission media and network protocols. FIG. 1 shows the network 102 as a single network; however, the network 102 can include multiple interconnected networks listed above.

The server 104 can be coupled to a network storage system. The network storage system can include two types of network storage devices: a local network storage 108 and a remote network storage 110. The local network storage 108 and the remote network storage 110 can each include at least one physical, non-transitory storage medium.

FIG. 1 shows the local storage network 108 as separate from the communication network 102. However, the local storage network 108 can be part of communication network 102 or another communication network. FIG. 1 shows the remote network storage 110 as separate from the communication network 102. However, the remote network storage 110 can be part of the communication network 102 or another communication network. In some embodiments, the remote network storage 110 can be coupled to the Internet.

Although not shown, client device 106 can include its own local storage medium. The local storage medium can be a local magnetic hard disk or solid state flash drive within the client device. Alternatively or in addition, the local storage medium can be a portal storage device, such as a USB-enabled or Firewire-enabled flash drive or magnetic disk drive.

The disclosed embodiment may involve retrieval by client 106 of a wide variety of file names and file types from local network storage 108, remote network storage 110, and/or local storage medium on client device 106. Such file names can include any suitable combination and number of letters, numbers, and/or characters. Such file types can include, for example, TXT, RTF, DOC, DOCX, XLS, XLSX, PPT, PPTX, PDF, MPG, MPEG, WMV, ASF, WAV, MP3, MP4, JPEG, TIF, MSG, or any other suitable file type or combination of file types. The files associated with these file names and/or file types can be stored in any suitable location within local network storage 108, remote network storage 110, and/or local storage medium on client device 106. The files associated with these file names and/or file types may be arranged in any suitable directories, folders, subfolders for viewing by a user.

Figure 2:
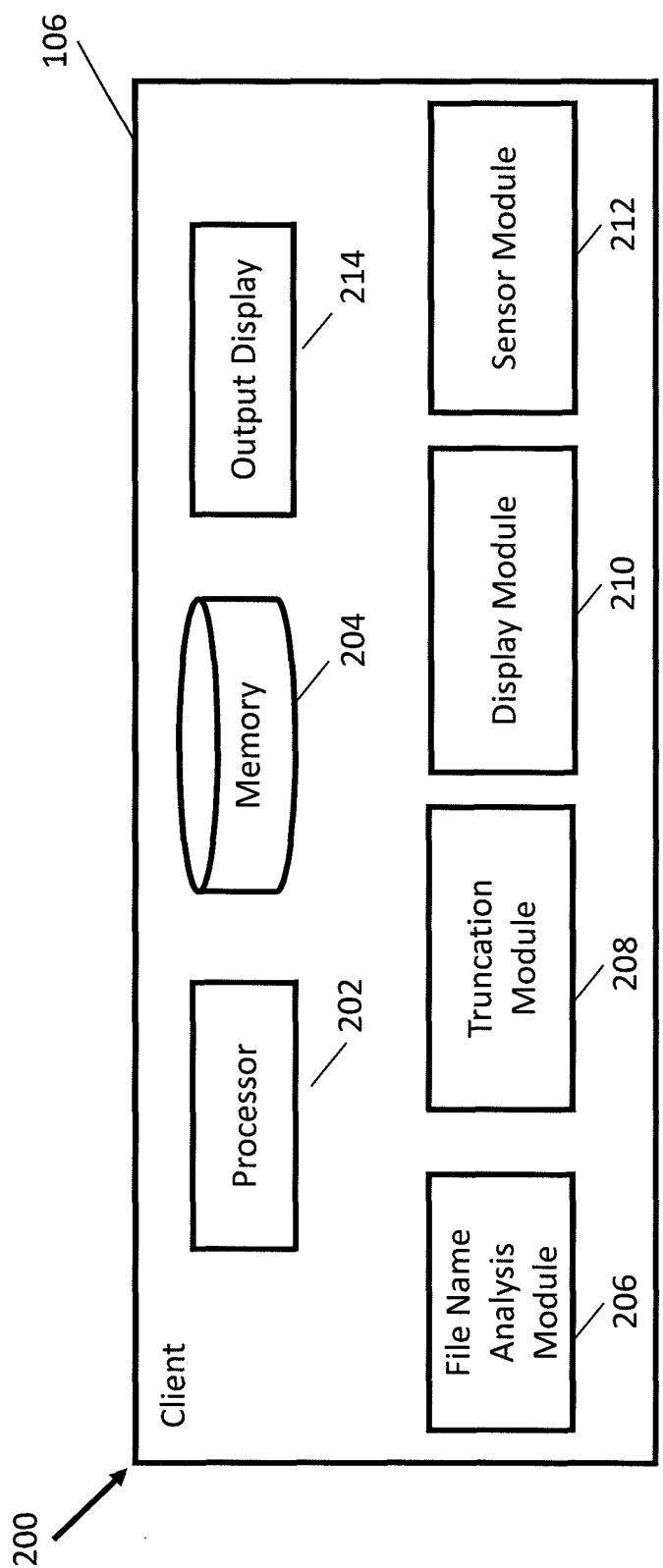
FIG. 2 illustrates a block diagram of a client device in accordance with certain embodiments of the disclosed subject matter.

FIG. 2 illustrates a block diagram of a client device in accordance with certain embodiments of the disclosed subject matter. The block diagram 200 shows a client device 106, which includes a processor 202, a memory module 204, a file name analysis module 206, a truncation module 208, a display module 210, a sensor module 212, and an output display 214.

Processor 202 can be configured as a central processing unit or application processing unit in client 106. Processor 202 might also be implemented in hardware using an application specific integrated circuit (ASIC), programmable logic array (PLA), field programmable gate array (FPGA), or any other integrated circuit. Memory 204 can be cache memory, non-transitory computer readable medium, flash memory, a magnetic disk drive, an optical drive, a programmable read-only memory (PROM), a read-only memory (ROM), or any other memory or combination of memories.

File name analysis module 206 can be configured as a specialized combination of circuitry and/or software capable of comparing and analyzing character strings representing file names that have been loaded into memory 204. For example, the circuitry may be configured as a series of buffers, comparators, and other computational components. File name analysis module 206 can identify similarities and/or differences among file names. File name analysis module 206 can further determine the combination of similarities and/or differences among file names that would provide enough descriptive information about the different file names.

Truncation module 208 can be configured as a specialized combination of circuitry and/or software capable of generating truncated representations of the character strings that are analyzed in file name analysis module 206 and stored in memory 204. Truncation module 208 can be configured to determine whether a file name can be displayed in its entirety on a display screen or requires truncations. Truncation module 208 can also generate truncated representations of file names based on the analysis of the similarities and/or differences among file names from file name analysis module 206. Alternatively or in addition, truncation module 208 can be configured to generate truncated representations of the file names using the traditional methods of head, mid, or tail truncation.

Display module 210 can be configured as a combination of circuitry and/or software capable of displaying file names onto output display 214. Display module 210 can be configured as graphics circuitry such as a graphics processing unit and software such as video drivers. Display module 210 can be configured to generate the display of characters representing the file names in their entirety and/or truncated representations of the file names. Display module 210 can also generate modified displays of the file names based on user manipulation of the truncated representations of the file names. The output display 214 may be an external monitor, such as a desktop monitor or terminal screen, or an integrated screen, such as a laptop screen or a smartphone screen, or any other suitable display.

Sensor module 212 can be configured as a combination of circuitry and/or software capable of receiving an input signal. In some embodiments, sensor module 212 can be configured as a touchscreen and controller chip in combination with specific driver software. In such embodiments, sensor module 212 can be configured to sense inputs on a touchscreen from a stylus or one more fingertips. In other embodiments, sensor module 212 can be configured to sense inputs from an input device. The inputs can be from at least one of a mouse, trackball, touchpad, track pad, control stick, and keyboard.

While modules 206, 208, 210, and 212 are described as a combination of circuitry and/or software, the modules 206, 208, 210, and 212 can be implemented in software using the memory 204. The software can run on a processor 202 capable of executing computer instructions or computer code.

FIGS. 3A-3D illustrate the display and manipulation of the display of file names in accordance with an embodiment of the disclosed subject matter. More particularly, FIGS. 3A-3D show how user-modifiable truncation may affect the display of a file name on an output display.

FIG. 3A shows an example of a typical file name. With advances in today's technology, file names are often long and full of descriptive detail. While these long file names may fit in its entirety on a computer monitor for a desktop computer or laptop computer, they will likely not fit on the smaller display screens of mobile devices such as smartphones and tablet computers.

As discussed earlier, truncation in systems today typically apply either head truncation, mid truncation, and/or tail truncation universally. As discussed earlier, head truncation obscures the leading characters of a file name. Mid-truncation obscures the middle characters of a file name. Tail truncation obscures the trailing characters of a file name.

FIG. 3B shows an example of mid-truncation as applied to the file name in FIG. 3A retrieved from either local network storage 108, remote network storage 110, or local storage medium on client device 106. As shown in the figure, the starting and trailing characters of the file name have been preserved while the middle characters of the file name have been obscured and replaced by an ellipsis.

In accordance with an embodiment of the invention, the location of the truncation in the file name may be dynamically adjusted to any suitable portion of the file name. FIG. 3C shows an example of the truncated file name when the location of the truncation (as represented by the ellipsis) is adjusted to the left of the middle characters (i.e., towards the leading characters of the file name). A signal from a touchscreen input to signify a fingertip of a user dragging an ellipsis left may move the ellipsis to the left of its original location. As a result, a different portion of the file name may be obscured by the ellipsis. Consequently, the portion of the file name that was previously obscured by the ellipsis may now be displayed. This operation obscures a portion of the file name that follows the original location of the ellipsis in order to reveal distinguishing information that was previously obscured.

FIG. 3D shows an example of the truncated file name when the location of the truncation (as represented by the ellipsis) is adjusted to the right of the middle characters (i.e., towards the leading characters of the file name). Similar to the operation in FIG. 3C, a signal from a touchscreen input to signify a fingertip of a user dragging an ellipsis right may move the ellipsis to the right of its original location. As a result, a different portion of the file name may be now obscured by the ellipsis. Consequently, a portion of the file name that was previously obscured by the ellipsis may now be displayed by this operation. As with FIG. 3C, this operation obscures a portion of the file name that follows the original location of the ellipsis in order to reveal distinguishing information that was previously obscured.

FIGS. 3B-3D are described as sensing the movement of a fingertip on a touchscreen to move the ellipsis to the left or right of a file name. However, any other movement may be sensed, including sensing the movement of a stylus on a touchscreen or movement of a cursor using an input device. The input device can be a mouse, trackball, touchpad, track pad, control stick, keyboard, or any other suitable device.

Figure 4:
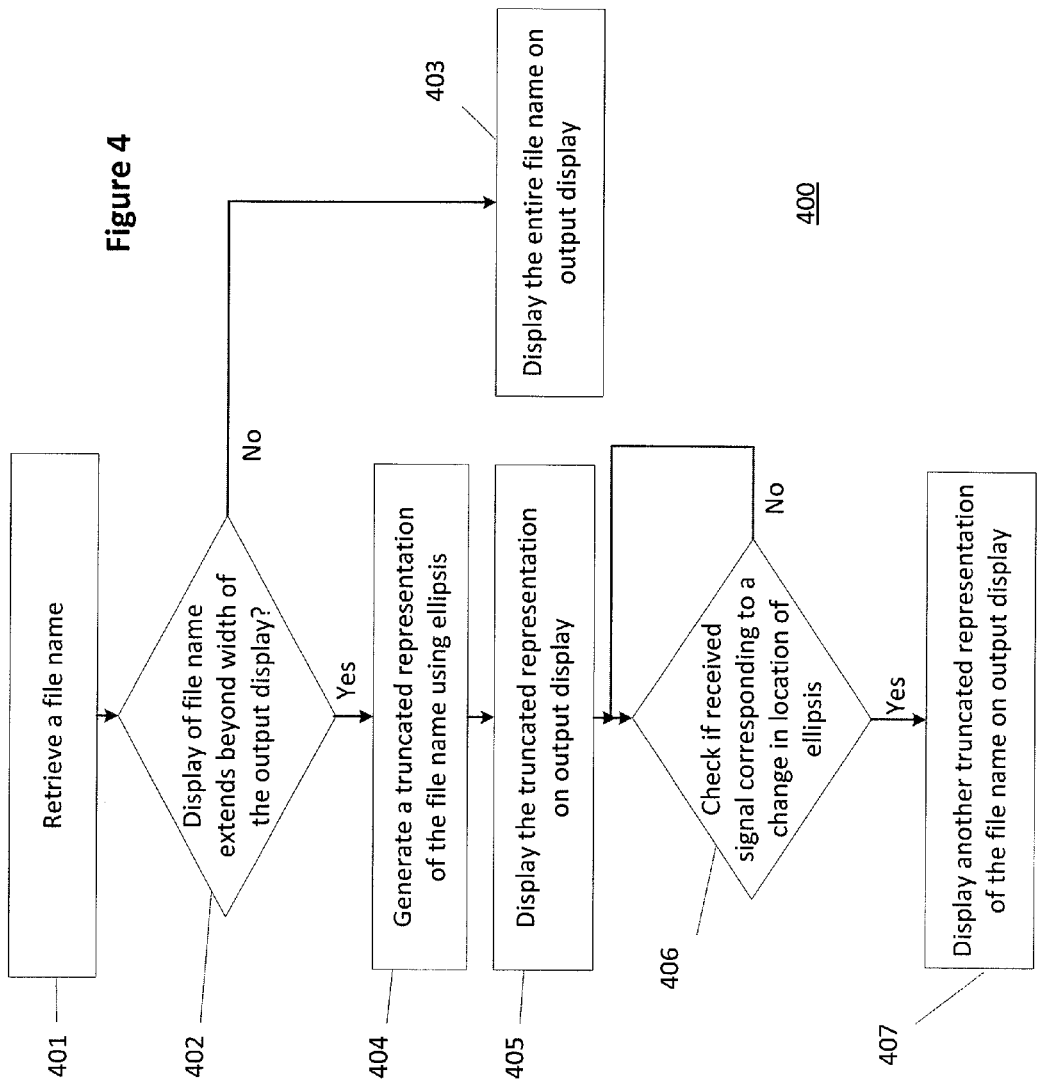
FIG. 4 is a flow diagram illustrating a process for displaying and manipulating the display of file names in accordance with certain embodiments of the disclosed subject matter.

FIG. 4 is a flow diagram illustrating a process for displaying and manipulating the display of file names in accordance with certain embodiments of the disclosed subject matter. In particular, FIG. 4 is a flow diagram illustrating user modifiable truncation as shown and described in connection with FIGS. 3A-3D. Process 400 can take place in the client 106 as described above in connection with FIGS. 1 and 2. In step 401, the client 106 retrieves at least one file name in response to a user request. The client 106 may retrieve file names from a local storage device (e.g., memory 204) via a local communications bus. Alternatively or in addition, the client 106 may retrieve file names from the local storage network 108 and/or the remote storage network 110 directly, or via communication network 102 and/or server 104.

Within client 106, the processor 202 alone and/or in combination with modules 206, 208, 210, 212 may facilitate the retrieval of file names. For example, processor 202 may facilitate the network socket connection, directory structure, and file name parsing when retrieving file names over communications network 102. Once the file name is retrieved, regardless of its origin, the retrieved file name may be locally stored in memory 204.

In step 402, the process determines whether the display of the retrieved file name will fit within an output display (e.g., output display 214). This determination can be made based on the display size, the font size, the length of the file name, the number of characters, or any other suitable factor or combination of factors. Processor 202 and/or file name analysis module 206 may communicate with display module 210 in order to obtain information relating to the display size and/or font size. These variables may be stored in memory 204. By comparing the length of the file name—in consideration of the font size—to the display size, processor 202 and/or file name analysis module 206 can determine whether the file name in its entirety may be viewable on an output display without truncation.

If the retrieved file name fits on the output display in its entirety, the process moves to step 403. In step 403, the process displays the entire file name on the output display (e.g., output display 214). This can be performed by the processor 202 and/or display module 210. This may be accomplished through retrieval of the file name from memory 204 and/or coordination with video and display drivers. The output display may be an external monitor, such as a desktop monitor or terminal screen, or an integrated screen, such as a laptop screen or a smartphone screen.

If the retrieved file name will not fit on the output display in its entirety, the process moves to step 404. In step 404, the process generates a truncated representation of the file name using an ellipsis to obscure a portion of the file name. This can be performed by the processor 202 and/or truncation module 208. This truncated representation, and the accompanying ellipsis, may be tailored to the width of the output display. Depending on the method of truncation, the truncated representation can have an ellipsis omitting any suitable portion of the file name. The location of the ellipsis may be determined by any suitable algorithm. Processor 202 and/or truncation module 208 may use traditional methods of truncation, such as head truncation, mid-truncation or tail truncation. Alternatively, processor 202 and truncation module 208 may use more complex algorithms (e.g., as described below in connection with FIG. 8). Upon generation of the truncated representation, processor 202 and/or truncation module 208 may store the truncated representation in memory 204 or in any other suitable storage medium local or external to the client 106 (e.g., storage 108 and/or 110).

In step 405, the process displays the truncated representation of the file name to the output display (e.g., output display 214). This can be performed by the processor 202 and/or display module 210. This may be accomplished through retrieval of the truncated representation from memory 204 and/or coordination with video and display drivers In step 406, the process checks for a signal corresponding to a change in location of the ellipsis. In some embodiments this can be performed by the processor 202 and/or sensor module 212. In those embodiments, processor 202 and/or sensor module 212 can first process the signal to determine whether the type of signal corresponds to a user's intent to change the location of the ellipsis. For example, manipulating a truncated file name on a smartphone may require a user to press and hold on the file name, e.g., "long press." Secondly, in those embodiments, processor 202 and/or sensor module 212 can detect the location and movement of the signal to determine whether the signal corresponds to the ellipsis in the truncated representation of the file name and a desired change to the ellipsis. This determination can be achieved by calculating coordinates across the output display and comparing those coordinates to the location of the input signal. Alternatively, this determination can be achieved by sensing the location of the signal relative to the characters in the file name, or based on any other suitable determination. Upon detecting one or both conditions, the processor 202 and/or sensor module 212 may precipitate step 407 or return to step 406 to again check for a signal corresponding to a change in location of the ellipsis.

If the process does not receive a signal corresponding to a change in location of the ellipsis, the process returns at step 406. In some embodiments, step 406 can correspond to a determination that either (1) the type of signal does not correspond to a user's intent to change the location of the ellipsis, e.g., not a "long press;" or (2) the location of the signal does not correspond to the truncated representation of the file name.

If the process receives a signal corresponding to a change in location of the ellipsis, the process moves to step 407. In step 407, the process generates another truncated representation of the file name on an output display (e.g., output display 214). This processing can be performed by the processor 202, truncation module 208, display module 210, sensor module 212, and/or memory 204, and may comprise several steps.

In one embodiment, processor 202 and/or sensor module 212 can detect the location of the movement of the signal. Next, processor 202 and/or truncation module 208 can generate a new truncated representation based on the signal. Processor 202 and/or truncation module 208 can generate the new truncated representation based on the original truncated representation or based on the original file name that can be retrieved from memory 204. Finally, processor 202 and/or display module 210 can display the new truncated representation on output display 214 through coordinating with video and display drivers.

In certain embodiments, the signal may correspond to an input on a touchscreen. In other embodiments, the input on the touchscreen corresponds to input from a stylus or fingertip input from a user. In those embodiments, a capacitive signal can be processed in order to determine a relative location and/or motion on the touchscreen. In other embodiments, the signal may correspond to a change in cursor position corresponding to any suitable input device such as mouse, trackball, touchpad, track pad, control stick, or keyboard.

Figures 5, 5A, 5B, 5C:
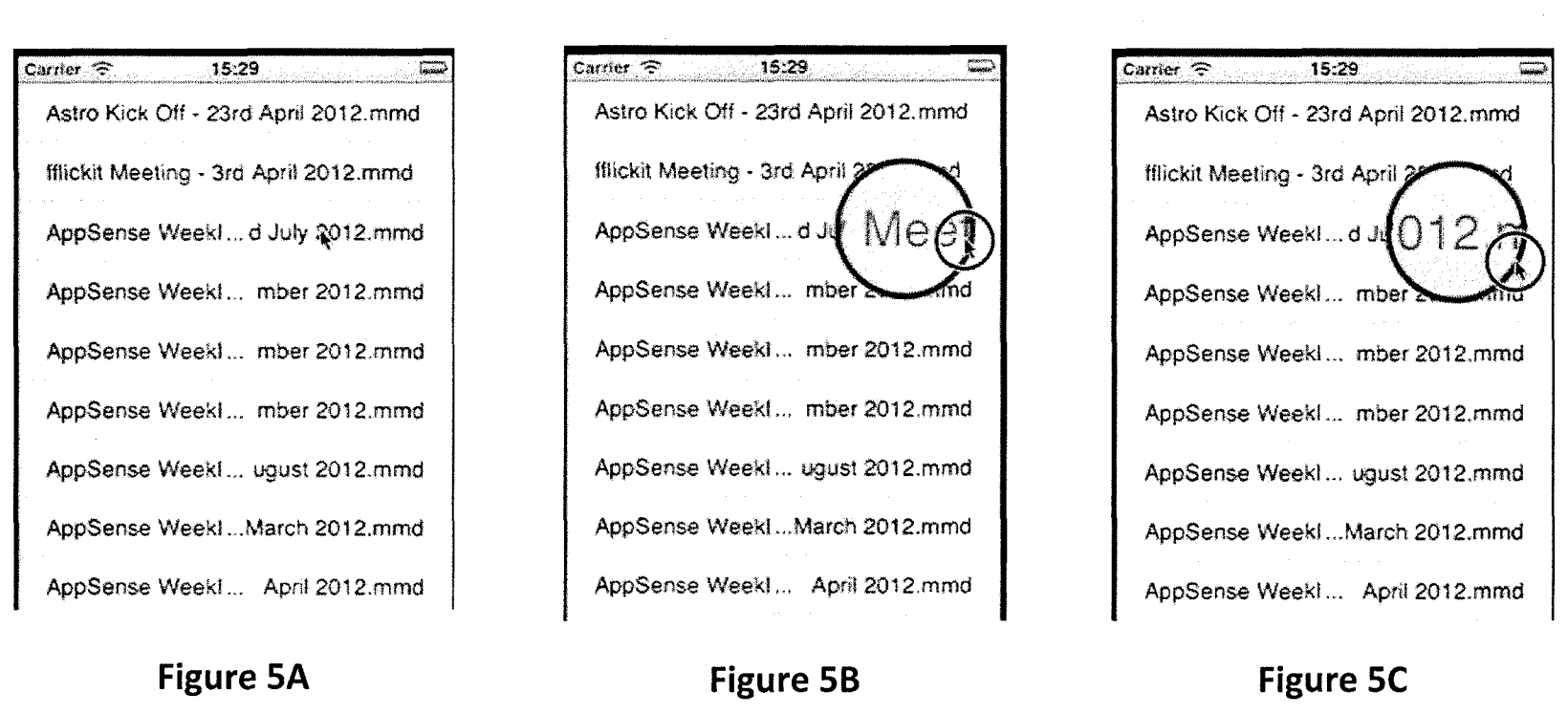

FIGS. 5A-5C illustrate the display and manipulation of the display of file names in accordance with an embodiment of the disclosed subject matter. More particularly, FIGS. 5A-5C show how an excerpt of a truncated representation of a file name may be displayed in a larger font size than the truncated representation.

FIG. 5A shows a list of file names that are displayed on an output display (e.g., output display 214). The output display shows some file names that are displayed in their entirety (i.e., the first two file names) and some file names that have been truncated using mid-truncation (i.e., the remaining, or last seven, file names). The output display also shows a pointer that can be used to select any of the file names, and in particular, any portion of a selected file name. For example, FIG. 5A shows a pointer pointing to the third file name. The third file name in its entirety can be "AppSense Weekly Meeting—3rd July 2012.mmd," but has been truncated to "AppSense Week1 . . . d July 2012.mmd" in order to fit in the output display. FIG. 5A also shows the pointer pointing towards the trailing characters of the third file name (around the characters "July 2012"). FIG. 5A shows a pointer in the shape of an arrow. However, any other suitable pointer, icon, or shape can be used including, for example, a cursor or a box. A user can position the pointer over any of the file names, and in particular any portion of the selected file name, using for example, an input to a touchscreen (e.g., from a stylus or a fingertip) or an input device (e.g., mouse, trackball, touchpad, track pad, control stick, or keyboard).

FIGS. 5B and 5C illustrate how a signal may trigger the client 106 to display an excerpt of a truncated representation of a file name. The client can receive a signal from the pointer corresponding to a location in the truncated representation. This signal may be a specific input signal such as a "single click," "double-click," "long press," "double tap," or any other suitable input signal. In response, the client can display an excerpt of the portion of the truncated representation. In certain embodiments, detection of the signal along any portion of the file name can trigger the display of the excerpt of the truncated representation. This can include a portion of the file name that is not currently visible on the output display (i.e., the truncated portion marked by an ellipsis) as shown in FIG. 5B. Alternatively, this can include a portion of the file name that is currently visible on the output display as shown in FIG. 5C.

FIG. 5B shows what happens when a client receives a signal from the pointer corresponding to a location in the file name that is not currently visible on the output display (i.e., the truncated portion marked by an ellipsis). The output display displays an excerpt of the file name, in particular the portion of the file name that was truncated (e.g., "Meet"). The displayed excerpt can include all or any suitable portion of the file name that was truncated. The displayed excerpt can include a portion of the file name that was truncated as well as a portion of the file name that was already visible on the output display.

FIG. 5C shows what happens when a client receives a signal from the pointer corresponding to a location in the file name that is currently visible on the output display. The output display displays an excerpt of the file name (e.g., "012.m"). The displayed excerpt can include all or any suitable portion of the file name that was already visible on the output display. The displayed excerpt can include a portion of the file name that was already visible on the output display as well as portion of the file name that was truncated.

The displayed excerpt can include any suitable number of characters of the file name. In some embodiments, the size of the excerpt is determined by the screen size, a predetermined maximum number of characters, or any other suitable criteria.

The displayed excerpt can be in a font size larger than the font size used to display the truncated representation. Alternatively, the displayed excerpt can be in a font size the same size as, or smaller than, the font size used to display the truncated representation. The displayed excerpt can be a font type that is the same as, or different from, the font type used to display the truncated representation. Additionally, the displayed excerpt can be bounded by a display object, such as a magnifying glass or loupe. In other embodiments, the display object may be a box or an overlay object. The shape and size of the display object can limit the size of the displayed excerpt. The combination of larger font and the display object can create the illusion that the user is "magnifying" the text for review.

In certain embodiments, reception of a series of signals at different locations along the truncated representation may trigger the display of different excerpts of the truncated representation. Processed quickly enough, the user can perceive that slowing moving the pointer along the length of the truncated representation can trigger a sliding window display of the magnification of adjacent portions of the truncated representation.

FIGS. 6A-6C illustrate the display and manipulation of the display of file names in accordance with an embodiment of the disclosed subject matter. More particularly, FIGS. 6A-6C show how an entire file name may be displayed using a dedicated text box in response to selecting a truncated representation of the file name.

FIG. 6A shows a list of file names that are displayed on an output display (e.g., output display 214) similar to that described above in connection with FIG. 5A. FIG. 6A shows a pointer pointing to the fourth file name. The fourth file name in its entirety can be "AppSense Weekly Meeting—4th September 2012.mmd," but has been truncated to "AppSense Week1 . . . mber 2012.mmd" in order to fit in the output display. FIG. 6A shows a pointer in the shape of an arrow. However, any other suitable pointer, icon, or shape can be used including, for example, a cursor or a box. A user can position the pointer over any of the file names, and in particular any portion of the selected file name, using for example, an input to a touchscreen (e.g., from a stylus or a fingertip) or an input device (e.g., mouse, trackball, touchpad, track pad, control stick, or keyboard).

FIG. 6B illustrates how a signal may trigger the client 106 to display a selected truncated representation of a file name in its entirety. The client can receive a signal from the pointer corresponding to any location in or around the truncated representation. The signal may be a specific input signal such as a "single click," "double-click," "long press," "double tap," or any other suitable input signal. In this embodiment, the selection can be indicated by the highlighting of the truncated representation.

FIG. 6C illustrates how the signal may trigger the client 106 to display the selected truncated representation of the file name in its entirety. This can be done, for example, in a text box that can wrap around the text to more than line in the output display or in any other suitable format. The text box can be displayed in any suitable location on the output display. In some embodiments, the text box can be displayed above, below, over, partially above, partially below, partially over the truncated representation of the selected file name. In other embodiments, the text box can be displayed along the top, bottom, left, or right of the output display. A text box or any other suitable display object can be used to display the selected file name in its entirety. The display of the entire file name can be in a font size the same size as, smaller than, or larger than the font size used to display the truncated representation. The display of the entire file name can be with a font type that is the same as, or different from, the font type used to display the truncated representation.

Figure 7:
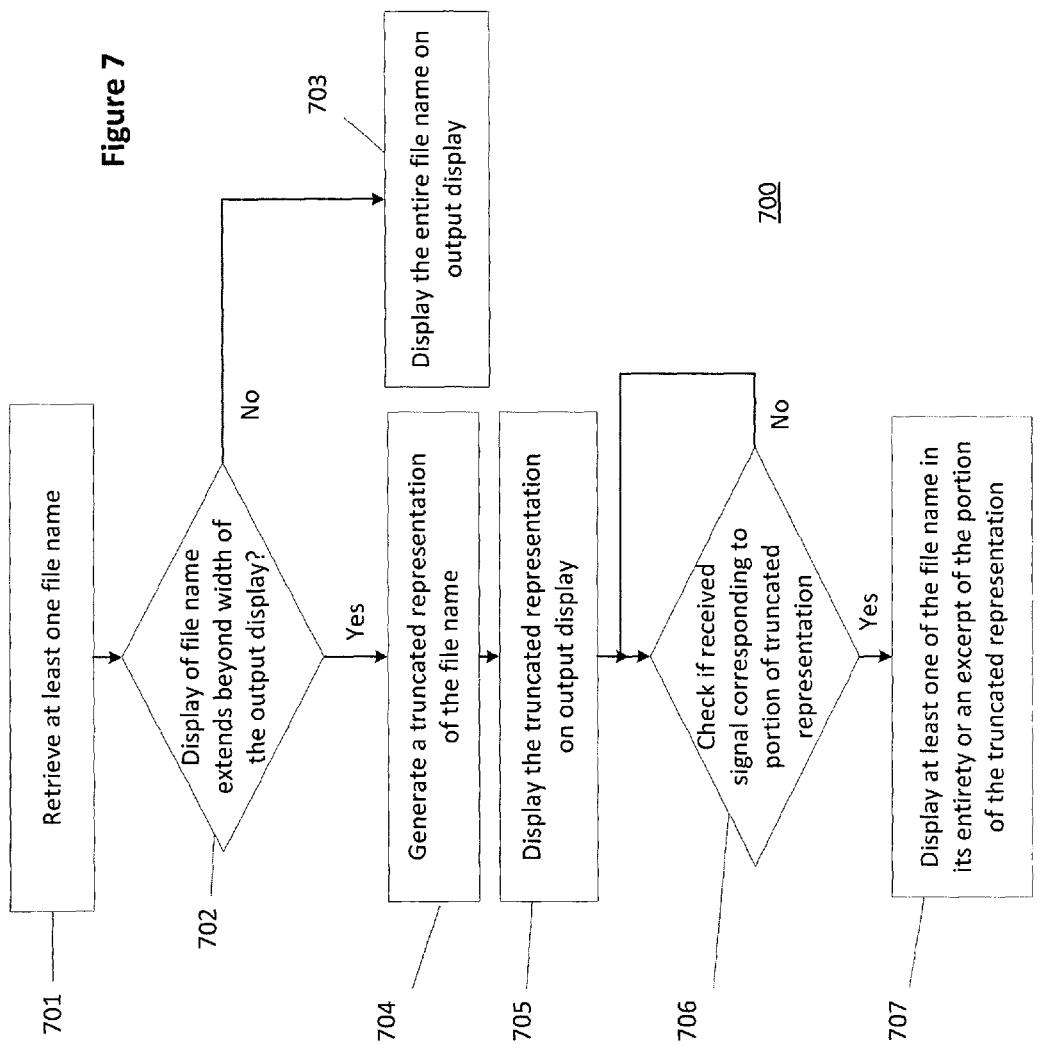
FIG. 7 is a flow diagram illustrating a process for displaying and manipulating the display of file names in accordance with certain embodiments of the disclosed subject matter.

FIG. 7 is a flow diagram illustrating a process 700 for displaying and manipulating the display of file names as shown and described in connection with FIGS. 5A-5C and 6A-6C. In process 700, steps 701, 702, 703, 704, 705 are similar to FIG. 4's process 400, steps 401, 402, 403, 404, 405, respectively.

In step 706, the process checks for a signal corresponding to a portion of the truncated representation of a selected file name. In some embodiments this can be performed by the processor 202 and/or sensor module 212. In those embodiments, processor 202 and/or sensor module 212 can first process the signal to determine whether the type of signal corresponds to a user's intent to change the display of the truncated representation (e.g., view the portion of the file name that has been obscured and replaced by an ellipsis, view the file name in its entirety). For example, viewing an excerpt of the file name or the entire file name on a smartphone may require a user to press and hold on the file name, e.g., "long press." Secondly, in those embodiments, processor 202 and/or sensor module 212 can detect the location and movement of the signal to determine whether the signal corresponds to the truncated representation of the file name. This determination can be achieved by calculating coordinates across the output display and comparing those coordinates to the location of the input signal. Alternatively, this determination can be achieved by sensing the location of the signal relative to the characters in the file name, or based on any other suitable determination. Upon detecting one or both conditions, the processor 202 and/or sensor module 212 may precipitate step 707 or return to step 706 to check for a signal corresponding to a portion of the truncated representation of a selected file name.

If the process does not receive a signal corresponding to a portion of the truncated representation of a selected file name, the process returns to step 706. In some embodiments, step 706 can correspond to a determination that either (1) the type of signal does not correspond to a user's intent to change the display of the truncated representation, e.g., not a "long press;" or (2) the location of the signal does not correspond to the truncated representation of the file name.

If the process receives a signal corresponding to the truncated representation of a selected file name, the process moves to step 707. In step 707, the process displays an excerpt of the selected portion of the truncated representation (as shown and described in connection with FIGS. 5A-5C) or the file name in its entirety (as shown and described in connection with FIGS. 6A-6C). This processing can be performed by the processor 202, truncation module 208, display module 210, sensor module 212, and/or memory 204 and may comprise several steps.

In one embodiment, processor 202 and/or sensor module 212 can detect the location of the signal within a file name and in particular, the portion of the file name. Next, processor 202 and/or truncation module 208 can generate a new display of the file name based on the signal. Processor 202 and/or truncation module 208 can generate the new display of the file name based on the original truncated representation or based on the original file name that can be retrieved from memory 204. Finally, processor 202 and/or display module 210 can display an excerpt of the selected portion of the truncated representation or the file name in its entirety the new truncated representation on output display 214 through coordinating with video and display driver.

Figure 8:
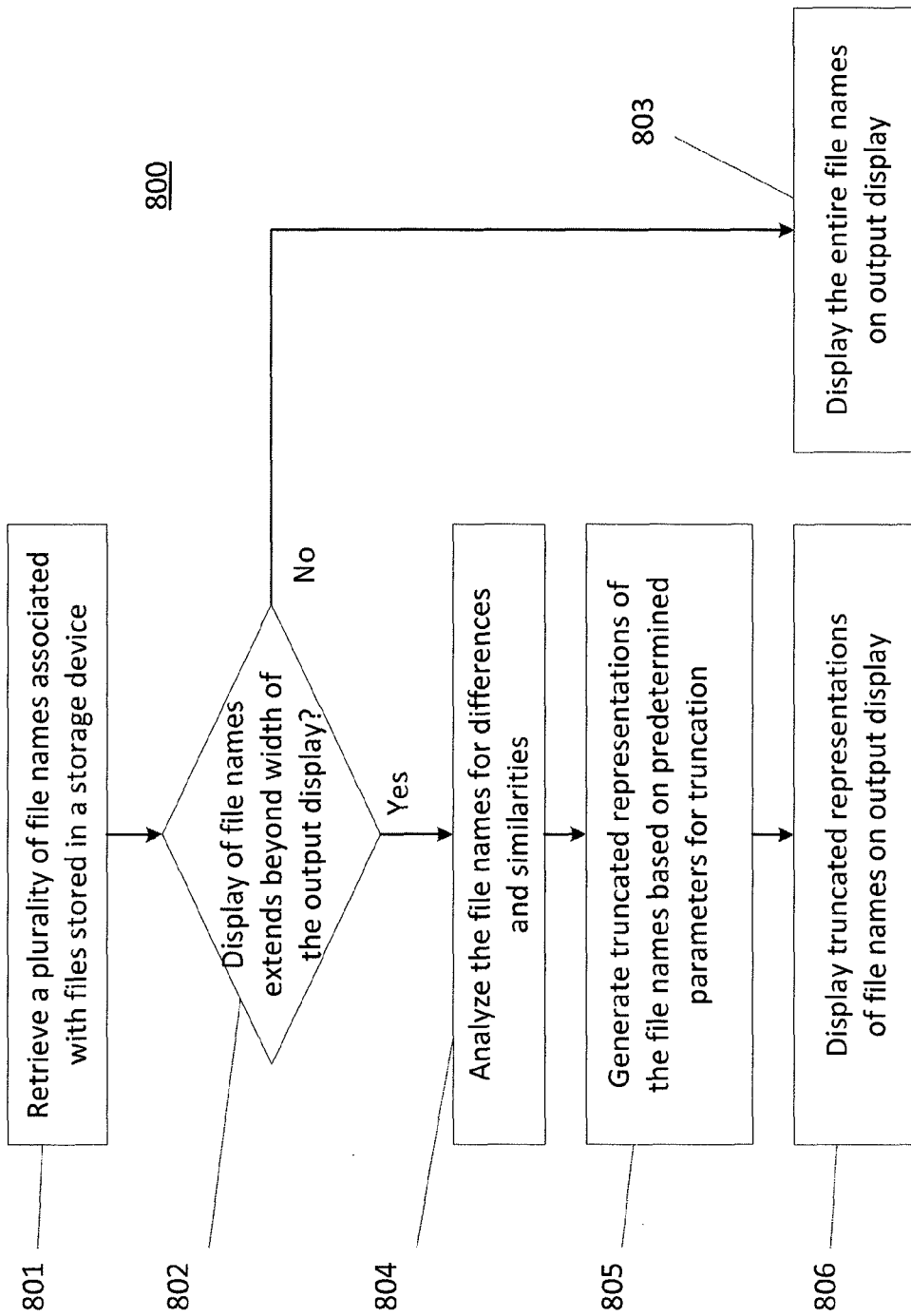
FIG. 8 is a flow diagram illustrating a process for manipulating the display of file names in accordance with certain embodiments of the disclosed subject matter.

FIG. 8 is a flow diagram illustrating a process 800 for manipulating the display of file names in accordance with certain embodiments of the disclosed subject matter. Process 800 can take place in the client 106 as described above in connection with FIGS. 1 and 2. In step 801, the client 106 retrieves a plurality of file names in response to a user request. The client 106 may retrieve file names from a local storage device (e.g., memory 204) via a local communications bus. Alternatively or in addition, the client 106 may retrieve the file names from the local storage network 108 and/or the remote storage network 110 directly, or via communication network 102 and/or server 104.

Within client 106, the processor 202 alone and/or in combination with modules 206, 208, 210, 212 may facilitate the retrieval of file names. For example, processor 202 may facilitate the network socket connection, directory structure, and file name parsing when retrieving file names over communications network 102. Once the file name is retrieved, regardless of origin, the retrieved file name may be locally stored in memory 204.

In step 802, the process determines whether the display of the retrieved file names will fit on an output display (e.g., output display 214). This determination can be made based on the display size, the font size, the length of the file name, the number of characters, or any other suitable factor or combination of factors. Processor 202 and/or file name analysis module 206 may communicate with display module 210 in order to obtain information relating to the display size and/or font size. These variables may be stored in memory 204. By comparing the lengths of the file names—in consideration of the font size(s)—to the display size, processor 202 and/or file name analysis module 206 can determine whether the file names in its entirety may be viewable on an output display without truncation.

For any retrieved file names that fit on the output display in its entirety, the process moves to step 803. In step 803, the process displays the entire file name on the output display (e.g., output display 214) similar to that described above in connection with FIG. 4, step 403.

For any retrieved file names that will not fit on the output display in its entirety, the process moves to step 804. In step 804, the process uses predetermined parameters to analyze these retrieved file names for the similarities and differences among each other. This can be performed by the processor 202 and/or file name analysis module 206. Depending on the predetermined parameters for truncation, certain similarities may be preserved to provide descriptive information, while others truncated to reduce non-descriptive duplicative information. For example, consider the group of file names discussed earlier:

AppSense Weekly Meeting—4th September 2012.txt
AppSense Weekly Meeting—5th September 2012.txt
AppSense Weekly Meeting—6th September 2012.txt The process can parse the subject matter information ("AppSense Weekly Meeting") from the date information ("September 2012"). Analyzing those portions of the file name separately, the predetermined parameters can be used to preserve important subject matter while truncating the duplicative information:

AppSense Week . . . 4th Sept . . . . txt
AppSense Week . . . 5th Sept . . . . txt
AppSense Week . . . 6th Sept . . . . txt This type of proximity analysis can be particularly advantageous when there are multiple files containing similar subject matter, where the key differentiating information can be date information. As shown above, when detecting the month, that name may be truncated to a recognizable short form. This type of redundancy in file names is common when retrieving file names from repositories containing documents, such as logs, reports, and meeting agendas. Additionally, this type of redundancy is common where file names are retrieved as the result of keyword searches through data repositories.

Parsing for content within the file name can generally employ separating character strings based on characters delimiters, such as a blank space, hyphen, underscore, period, comma, semicolon, colon, parenthesis, etc. before and/or after a word. Using character delimiters, other types of information may be parsed, such as timestamps, names, version numbers, file types, file extensions, or any other suitable information. Where any information cannot be parsed, the process can fall back on traditional, non-content-specific methods of truncation (e.g., head, mid, or tail truncation).

Based on the analysis performed in step 804, the process then generates truncated representations of the file names based on the predetermined parameters in step 805. This can be performed by the processor 202 and/or truncation module 208. As shown earlier, the truncated representation can preserve distinguishing information to highlight both the similarities and differences of the file names. As these truncated file names are generated, they may be stored in memory 204 prior to display.

In step 806, the process displays the truncated representations of the file names to the output display (e.g., output display 214). This can be performed by the processor 202 and/or display module 210. This may be accomplished through retrieval of the truncated representation from memory 204 and/or coordination with video and display drivers. Step 806 may be performed separately from, or alternatively in conjunction with, step 803.

In some embodiments, process 800 (FIG. 8) may also be used in conjunction with process 400 (FIG. 4) and/or process 700 (FIG. 7). In some embodiments, after completion of step 806, the truncation may be further modified as shown in process 400 and/or process 700. In other embodiments, process 800 may be used to perform step 404 in process 400 and/or step 704 in process 700.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method comprising:
    retrieving a character string;
    determining whether truncation is needed in order to display the character string on an output display;
    generating a first truncated representation of the character string when the character string extends beyond a width of the output display;
    displaying the first truncated representation on the output display, wherein the first truncated representation includes a truncation symbol at a first location to omit a first portion of the character string;
    receiving a signal corresponding to the truncation symbol at the first location;
    sensing a change in the signal to a second location of the character string that corresponds to a second portion of the character string, wherein the second location is dynamically adjustable to any portion of the character string; and
    in response to sensing the change in the signal to the second location, moving the truncation symbol to the second location to display a second truncated representation of the character string on the output display, wherein the second truncated representation includes (1) the truncation symbol used to omit the second portion of the character string, and (2) the first portion of the character string that was previously omitted.

2. The method of claim 1 further comprising receiving the signal in response to detecting at least one of (1) an input on a touchscreen corresponding to the output display; and (2) detecting a location of a cursor from an input device.

3. The method of claim 2 further comprising detecting the input on the touchscreen from a user stylus or finger.

4. The method of claim 2 further comprising detecting the location of the cursor from a mouse, trackball, touchpad, track pad, control stick, and keyboard.

5. The method of claim 1 further comprising:
    receiving a second signal corresponding to the truncation symbol at the first location or the second location; and
    in response to the second signal, displaying the character string in its entirety or an excerpt of the first truncation representation or the second truncated representation of the character string.

6. The method of claim 1 wherein generating the first truncated representation of the character string comprises:
    analyzing the character string with a second character string for differences and similarities using a computing processor; and
    generating the first truncated representation of the character string based on predetermined parameters for truncation, wherein the first truncated representation includes similar and different portions of the character string and the second character string that maintain descriptive information that differentiates the character string from the second character string.

7. The method of claim 1 wherein generating the first truncated representation of the character string comprises performing at least one of head, middle, and tail truncation.

8. An apparatus comprising:
    a processor configured to run a module stored in memory, the module configured to:
        retrieve a character string;
        determine whether truncation is needed in order to display the character string on an output display;
        generate a first truncated representation of the character string when the character string extends beyond a width of the output display;
        display the first truncated representation on the output display, wherein the first truncated representation includes a truncation symbol at a first location to omit a first portion of the character string;
        receive a signal corresponding to the truncation symbol at the first location;
        sense a change in the signal to a second location of the character string that corresponds to a second portion of the character string, wherein the second location is configured to be dynamically adjustable to any portion of the character string; and
        in response to sensing the change in the signal to the second location, move the truncation symbol to the second location to display a second truncated representation of the character string on the output display, wherein the second truncated representation includes (1) the truncation symbol used to omit the second portion of the character string, and (2) the first portion of the character string that was previously omitted.

9. The apparatus of claim 8 wherein the module is further configured to receive the signal in response to detecting at least one of (1) an input on a touchscreen corresponding to the output display; and (2) detecting a location of a cursor from an input device.

10. The apparatus of claim 9 wherein the module is further configured to detect the input on the touchscreen from a user stylus or finger.

11. The apparatus of claim 9 wherein the module is further configured to detect the location of the cursor from a mouse, trackball, touchpad, track pad, control stick, and keyboard.

12. The apparatus of claim 8 wherein the module is further configured to:
    receive a second signal corresponding to the truncation symbol at the first location or the second location; and
    in response to the second signal, display the character string in its entirety or an excerpt of the first truncated representation or the second truncated representation of the character string.

13. The apparatus of claim 8 wherein the module configured to generate the first truncated representation of the character string is further configured to:
    analyze the character string with a second character string for differences and similarities using a computing processor; and
    generate the first truncated representation of the character string based on predetermined parameters for truncation, wherein the first truncated representation includes similar and different portions of the first and second character strings that maintain descriptive information that differentiates the character string from the second character string.

14. The apparatus of claim 8 wherein the module configured to generate the first truncated representation of the character string is further configured to perform at least one of head, middle, and tail truncation.

15. A non-transitory computer readable medium having executable instructions that are operable to cause an apparatus to:
    retrieve a character string;
    determine whether truncation is needed in order to display the character string on an output display;
    generate a first truncated representation of the character string when the character string extends beyond a width of the output display;
    display the first truncated representation on the output display, wherein the first truncated representation includes a truncation symbol at a first location to omit a first portion of the character string;
    receive a signal corresponding to the truncation symbol at the first location;

sense a change in the signal to a second location of the character string that corresponds to a second portion of the character string, wherein the second location is configured to be dynamically adjustable to any portion of the character string; and in response to sensing the change in the signal to the second location, move the truncation symbol to the second location to display a second truncated representation of the character string on the output display, wherein the second truncated representation includes (1) the truncation symbol used to omit the second portion of the character string, and (2) the first portion of the character string that was previously omitted.

16. The non-transitory computer readable medium of claim 15 wherein the executable instructions are further operable to cause the apparatus to receive the signal in response to detecting at least one of (1) an input on a touchscreen corresponding to the output display; and (2) detecting a location of a cursor from an input device.

17. The non-transitory computer readable medium of claim 16 wherein the executable instructions are further operable to cause the apparatus to detect the input on the touchscreen from a user stylus or finger.

18. The non-transitory computer readable medium of claim 16 wherein the executable instructions are further operable to cause the apparatus to detect the location of the cursor from a mouse, trackball, touchpad, track pad, control stick, and keyboard.

19. The non-transitory computer readable medium of claim 15 wherein the executable instructions are further operable to cause the apparatus to:

receive a second signal corresponding to the truncation symbol at the first location or the location; and in response to the second signal, display the character string in its entirety or an excerpt of the first truncated representation or the second truncated representation of the character string.

20. The non-transitory computer readable medium of claim 15 wherein the executable instructions that are operable to cause the apparatus to generate the first truncated representation of the character string are further operable to:

analyze the character string with a second character string for differences and similarities using a computing processor; and generate the first truncated representation of the character string on predetermined parameters for truncation, wherein the first truncated representation includes similar and different portions of the first and second character strings that maintain descriptive information that differentiates the character string from the second character string.

* * * * *